(12) United States Patent
Stone et al.

(10) Patent No.: US 9,266,987 B2
(45) Date of Patent: Feb. 23, 2016

(54) METHOD OF MAKING LOW EXTRACTABLE COATINGS USING RADIATION CURABLE COMPOSITIONS CONTAINING AMINOACRYLATES

(75) Inventors: Vincent Stone, Brussels (BE); Francis Bergiers, La Hulpe (BE); Thierry Randoux, Braine l'Alleud (BE); Christian Lucot, Limas (FR)

(73) Assignee: ALLNEX BELGIUM S.A., Brussels (BE)

( * ) Notice: Subject to any disclaimer, the term of this patent is extended or adjusted under 35 U.S.C. 154(b) by 858 days.

(21) Appl. No.: 11/919,945

(22) PCT Filed: Jun. 1, 2006

(86) PCT No.: PCT/EP2006/005228
§ 371 (c)(1),
(2), (4) Date: Dec. 14, 2007

(87) PCT Pub. No.: WO2006/131259
PCT Pub. Date: Dec. 14, 2006

(65) Prior Publication Data
US 2009/0098304 A1 Apr. 16, 2009

(30) Foreign Application Priority Data
Jun. 10, 2005 (EP) .................................... 05012507

(51) Int. Cl.
*C08F 220/34* (2006.01)
*C09D 133/14* (2006.01)

(52) U.S. Cl.
CPC ............ *C08F 220/34* (2013.01); *C09D 133/14* (2013.01)

(58) Field of Classification Search
CPC ...... B05D 3/067; C08F 220/34; C09D 133/14

USPC ................... 427/496, 508; 560/170; 528/310
See application file for complete search history.

(56) References Cited

U.S. PATENT DOCUMENTS

| 5,482,649 A | 1/1996 | Meixner et al. |
| 5,516,860 A * | 5/1996 | Reich et al. ................... 525/531 |
| 5,543,557 A | 8/1996 | Bergvall |
| 6,172,129 B1 | 1/2001 | Fan et al. |
| 6,177,144 B1 | 1/2001 | Kranig et al. |
| 2005/0245636 A1 | 11/2005 | Fechter et al. |

FOREIGN PATENT DOCUMENTS

| JP | 7-149849 | | 6/1995 |
| JP | 07149849 A | * | 6/1995 |
| JP | 2000-86713 | | 3/2000 |
| WO | 02/32851 | | 4/2002 |

OTHER PUBLICATIONS

Partial Translation of JP07149849A.*
Progress in Polymer Science, 2006, vol. 31, pp. 487-531, "Michael addition reactions in macromolecular design for emerging technologies", B.D. Mather, K. Viswanathan, K.M. Miller, T.E. Long.

* cited by examiner

*Primary Examiner* — Elena T Lightfoot
(74) *Attorney, Agent, or Firm* — Wenderoth, Lind & Ponack, L.L.P.

(57) ABSTRACT

A method of making low extractable coatings, varnishes, adhesives or inks comprising the steps of:
(a) providing a radiation curable composition,
(b) applying said composition onto a surface, and
(c) irradiating the surface with actinic radiation or electron beam,
wherein the radiation curable composition comprises at least one amino(meth)acrylate obtained by reacting at least one primary and/or secondary amine (A) with at least one (meth)acrylated ethoxylated polyol (B) having a degree of alkoxylation of at least 4.

18 Claims, No Drawings

METHOD OF MAKING LOW EXTRACTABLE COATINGS USING RADIATION CURABLE COMPOSITIONS CONTAINING AMINOACRYLATES

BACKGROUND OF THE INVENTION

The present invention relates to aminoacrylates and their use for making radiation curable compositions for making low odor and/or low extractable coatings, varnishes, adhesives or inks.

Radiation curable, low viscosity inks and coatings are typically composed of mixtures of acrylated monomers and/or oligomers. However, typically monomers which are used to control viscosity of ink or coating compositions do not react completely during polymerization upon exposure to irradiation (UV or electron beam radiation) and remain as residual components in the dried printing ink or coating films and are subject to migration by absorption as well as surface contact. This migration leads to problems, particularly for printing or coating "odor" or "off-taste" sensitive packaging for package such as containers for food and for such applications which require negligible amounts of extractables from cured printing inks or coatings such as pharmaceutical packaging.

It is known to add to radiation curable compositions comprising monomers or oligomers, amines or acrylated amines (aminoacrylates) that enhance the curing of the monomers and oligomers. EP 280222 teaches the use of addition products of a primary mono-amine with (meth)acrylic esters of polyols to enhance the curing rate, even in the presence of oxygen. U.S. Pat. No. 5,482,649 discloses that the modification of acrylated ethoxylated polyols with amines at low level leads to low viscosity aminoacrylates with high reactivities during radiation curing. EP1147098 discloses a (meth)acrylate compound which is the reaction product of a cyclic secondary amine and a poly(meth)acrylate having at least three (meth)acrylate groups, which is useful for radiation curable coating or ink composition having low viscosity, low volatility, and high cure rate under radiation. EP1147098 more specifically discloses the reaction products of ethoxylated trimethylolpropane triacrylate and propoxylated glycerol triacrylate with morpholine.

However when used in compositions for making coatings, varnishes, adhesives and inks, more particularly for food-packaging applications, most of these known aminoacrylates tend to migrate. There is still a need for radiation curable ink, varnish, adhesive and coating compositions having insignificant odor, off-taste and/or extractable components after curing.

The present invention solves these problems.

BRIEF SUMMARY OF THE INVENTION

The present invention therefore relates to a method of making low extractable coatings, varnishes, adhesives or inks wherein a radiation curable composition comprising at least one amino(meth)acrylate obtained from the reaction of at least one primary and/or secondary amine (A) with at least one (meth)acrylated ethoxylated and/or propoxylated polyol (B) having a degree of alkoxylation of at least 4, is used.

DETAILED DESCRIPTION OF THE INVENTION

By the term "(meth)acryl" is to be understood as to encompass both acryl and methacryl compounds or derivatives as well as mixtures thereof.

(Meth)acrylated ethoxylated and/or propoxylated polyols (B) are well known in the art. They can be prepared from (meth)acrylic acid and polyols in the presence of catalysts. The preparation of (meth)acrylated ethoxylated and/or propoxylated polyols (B) has for example been disclosed in U.S. Pat. No. 5,543,557. The polyols preferably used in the present invention comprise at least 3 (meth)acrylic groups.

By degree of alkoxylation of the polyols (B) is to be understood the number of alkoxy groups, i.e. ethoxy and propoxy groups, present per molecule of (meth)acrylated ethoxylated and/or propoxylated polyol (B). The polyols suitable for the present invention have a degree of alkoxylation of at least 4. In general the degree of alkoxylation does not exceed 15. Preferred are polyols (B) having a degree of alkoxylation of higher than 4, more particularly of at least 5.

Suitable (meth)acrylated ethoxylated and/or propoxylated polyols include ethoxylated and/or propoxylated glycerol tri(meth)acrylates, ethoxylated and/or propoxylated trimethylolpropane tri(meth)acrylates, ethoxylated and/or propoxylated pentaerythritol tetra(meth)acrylates.

Preferred are (meth)acrylated ethoxylated polyol propoxylates, i.e. polyols comprising both ethoxy and propoxy groups, especially those obtained by the process disclosed in U.S. Pat. No. 5,543,557. Particularly preferred are (meth)acrylated ethoxylated polyol propoxylates having a molar ratio of propoxylate to ethoxylate of 1:0.1 to 1:10.

Particularly preferred are the tetraacrylates of ethoxylated pentaerythritol propoxylates having a molar ratio of propoxylate to ethoxylate of 1:0.1 to 1:10, more preferably those having a degree of alkoxylation of 5 to 15, and especially those having a degree of alkoxylation of 7 to 12.

Mixtures of (meth)acrylated ethoxylated and/or propoxylated polyols may be used. The primary or secondary amine (A) used to prepare the amino(meth)acrylates used in the invention is generally selected from amines having a molecular weight of 31 to 300, preferably from 45 to 250. Suitable amines respond to formula (I)

wherein $R^1$ is an alkyl, optionally substituted by hydroxy, alkoxy, tertiary amine and/or aryl, and, $R^2$ is hydrogen or an alkyl, optionally substituted by hydroxy, alkoxy, tertiary amine and/or aryl, with the proviso that $R^1$ and $R^2$ may be linked together in order to form a ring.

Amines which are particularly useful in the process according to the invention are n-propylamine, isopropylamine, n-butylamine, isobutylamine, sec-butylamine, tert-butylamine, 3-methylbutylamine, n-hexylamine, n-octylamine, 2-ethylhexylamine, isononylamine, cyclopentylamine, cyclohexylamine, 2-methylcyclohexylamine, N,N-(di-tert-butyl)ethyleneamine, benzylamine, 2-(2-aminoethoxy)ethanol, 5-aminopentanol, ethanolamine, 1-aminopropan-2-ol, 3-amino-1-propanol, 3-(diethylamino)propylamine, 2-(diethylamino)ethylamine, 1-methyl-4-(diethylamino)butylamine, 2,2-(di-tert-butylamino)ethylamine, 3-(dimethylamino)propylamine, 2-methoxyethylamine, 2-ethoxyethylamine, 3-methoxypropylamine, 1-methoxyisopropylamine, 3-ethoxypropylamine, 3-isopropoxypropylamine, 3-(2-methoxyethoxy)propylamine, 3-(2-ethylhexyloxy)propylamine, diethylamine, di-n-propylamine, diisopropylamine, di-n-hexylamine, N-methylbutylamine, N-ethylbutylamine, di-n-butylamine, diisobutylamine, di-n-octylamine, bis(2-ethylhexyl)amine, N-ethyl-1,2-dimethylpropylamine, dicyclohexylamine, cyclohexylmethylamine, cyclohexylethylamine, N-methylbenzylamine, 2-methylaminoethanol, 2-ethylaminoethanol, 2-butylaminoethanol, diethanolamine, diisopropanolamine, 3-(2-hydroxyethyl)aminopropanol, bis(2-methoxyethyl)amine, bis(3-dimethylaminopropyl)amine, pyrrolidine, piperidine, morpholine, 2,6-dimethylmorpholine.

Preferred are alkylamines and dialkylamines, more particularly those where the alkyl groups, each independently, comprise from 1 to 12 carbon atoms, preferably from 1 to 8 carbon atoms, optionally substituted by an hydroxy group.

Especially preferred are methylamine, ethylamine, propylamine, butylamine, hexylamine, 2-ethylhexylamine, cyclohexylamine, dimethylamine, diethylamine, dipropylamine, dibutylamine, ethanolamine and mixtures thereof.

The reaction between (meth)acrylates and amines is known as Michael addition reaction, both primary and secondary amines are suitable. The reaction between the (meth)acrylate and the amine can take place without any catalyst or solvent. The reaction can be carried out at temperature between −30 to 150° C., the preferred temperature is from 25 to 100° C. Although solvent is not required it may be used to facilitate the heat and mass transfer. The reaction of the acrylate with the amine is preferably carried out in an inert gas atmosphere, for example, under nitrogen or argon, to prevent or minimize unwanted side reactions. However, this is not necessary for a successful reaction.

In carrying out the reaction the (meth)acrylated polyol (B) can be added to the amine (A) or the amine (A) can be added to the (meth)acrylated polyol (B) the latter procedure is preferred.

In the reaction, one or more of the (meth)acryl groups of the (meth)acrylated polyol reacts to displace the amino hydrogen atom while the rest of (meth)acryl groups of the (meth)acrylated polyol is not affected.

The amount of amine (A) to (meth)acrylated polyol (B) is generally such that the molar ratio of amino groups of (A) to (meth)acrylic double bonds of (B) is 0.01:1 to 0.5:1. Preferably the amount of amine (A) to (meth)acrylated polyol (B) is such that the molar ratio of amino groups of (A) to (meth)acrylic double bonds of (B) is at least 0.05, more preferably at least 0.07. The molar ratio does preferably not exceed 0.2:1. In case a primary amine is used, the molar ratio does preferably not exceed 0.15:1.

Depending on the quantities and nature of the amine (A) and (meth)acrylated polyol (B) used in the reaction, a single amino(meth)acrylate or a mixture of different amino(meth)acrylates, optionally in the presence of (unreacted) (meth)acrylated polyol (B) can obtained.

The completion of the reaction can be followed for example by measuring the amount of free amine. At the completion of the reaction, the amine acrylate can be recovered as residue product; however, in some instances recovery by conventional distillation and fractionation procedures is possible. Preferably the residue of free amine is eliminated from the amino(meth)acrylate at levels below 1000 ppm, more preferably at levels below 500 ppm, especially of at most 200 ppm. Elimination of the free amine can be done by any method suitable therefore, such as stripping, for example with air under reduced pressure. Although it is possible to separate the unreacted (meth)acrylated polyol (B) from the amino(meth)acrylate, generally the (meth)acrylated polyol (B) is not separated from the amino(meth)acrylate before further use in radiation curable compositions.

To prevent (meth)acrylate polymerization various inhibitors or stabilizers may also be added during or after the reaction. Typical inhibitors such aromatic or aliphatic phosphites can be used.

The amino(meth)acrylates obtained after this reaction and used in the invention preferably have a viscosity of 50 to 750 mPa·s at 25° C., more preferably of 70 to 500 mPa·s.

The amino(meth)acrylates obtained after this reaction and used in the invention preferably have a nitrogen content of at least 0.2%, more preferably of at least 0.5%. The nitrogen content does preferably not exceed 2% by weight, more preferably not 1.5%.

The amino(meth)acrylates obtained after this reaction and used in the invention preferably have a content of double bonds (calculated as meq C=C/g) of 1 to 7, more preferably of 2.5 to 6.5.

The present invention also relates to the amino(meth)acrylates obtainable from the reaction of one or more (meth)acrylated ethoxylated polyol propoxylates having a degree of alkoxylation of at least 4 and a molar ratio of propoxylate to ethoxylate of 1:0.1 to 1:10 with at least one primary or secondary amine (A) such as defined here above. The amino(meth)acrylates are preferably obtained from the reaction in a molar ratio of amino groups of (A) to (meth)acrylic double bonds of (B) is 0.01:1 to 0.5:1.

The present invention also relates to the use of such amino(meth)acrylates, especially in the radiation curable compositions such as described here below.

The invention more specifically relates to the amino(meth)acrylates obtained from tetra(meth)acrylates of ethoxylated pentaerytritol propoxylates, tri(meth)acrylates of ethoxylated glycerol propoxylates and tri(meth)acrylates of ethoxylated trimethylolpropane propoxylates, as well as mixtures thereof.

These amino(meth)acrylates preferably have a nitrogen content of at least 0.2%, more preferably of at least 0.5%. The nitrogen content does preferably not exceed 2% by weight, more preferably not 1.5%.

These amino(meth)acrylates preferably have a content of double bonds (calculated as meq C=C/g) of at least 1, more preferably of at least 2.5.

These amino(meth)acrylates have been found to be very effective in UV/EB curing and can be used alone or along with other (meth)acrylated compounds. These amino(meth)acrylates are readily cured by ultraviolet light radiation or electron beam radiation. Curing can be achieved without the need of an additional co-activator. These co-activators (usually a tertiary amine) are needed to initiate the radical polymerization when type II photoinitiators are used and helps to counteract oxygen inhibition when curing occurs under air. Having typically a low molecular weight, these co-activators are also known to contribute much to the odour of the compositions and are generally easily extracted.

The amino(meth)acrylates according to the invention show themselves very low levels of components able to be extracted. In particular, they contain very low levels (<1000 ppm) of low molecular weight (meth)acrylates such as glycol (meth)acrylates (e.g. hydroxyethyl (meth)acrylate, diethylene glycol di(meth)acrylates) or polyol(meth)acrylates (e.g. trimethylolpropane tri(meth)acrylate), well-known to be present in (meth)acrylates derived from alkoxylated polyols.

The amino(meth)acrylates according to the invention have also a low odour after cure, which make them useable in applications such as food packaging where off-odours should be absolutely avoided. Furthermore, these amino(meth)acrylates have typically a low enough viscosity (<500 mPas) to limit or even avoid the use of a thinner in the composition, be it a low molecular weight monomers or a solvent. These thinners are well-known to be easily extracted and/or give rise to odorous compositions. Moreover, these amino(meth)acrylates show a pot-life long enough to make them useable in an industrial environment. Eventually, these amino(meth)acrylates have typically a low colour (<1 Gardner), which make them useable in clear coatings, adhesives or varnishes.

The radiation curable composition used in the present invention usually contains at least 5% by weight of one or more amino(meth)acrylate. Preferably the composition comprises at least 10% by weight of amino(meth)acrylate. The amount of amino(meth)acrylate usually does not exceed 99% by weight.

The radiation curable composition usually contains besides the one or more amino(meth)acrylate, at least one radiation curable polymer precursor other than the amino (meth)acrylate. The term polymer precursor is used to designate a monomer or oligomer or mixtures thereof which have suitable polymerisable functionality, preferably comprising at the chains ends or laterally along the chain, one or more acrylic, methacrylic or vinyl groups. This radiation curable polymer precursor is generally a monomer or oligomer comprising one or more acrylic, methacrylic or vinyl group.

Preferred oligomers include (meth)acrylated acrylic oligomers, aromatic acid (meth)acrylates, (meth)acrylated polybutadienes, (meth)acrylated polyesters, urethane(meth)acrylates, epoxy(meth)acrylates and hyperbranched (meth) acrylates such as hyperbranched polyester polyol (meth) acrylates.

Preferred oligomers are those having a molecular weight of at least 1000 and not more than 6000 Dalton.

When used, the quantity of oligomer in the radiation curable composition is generally at least 5% by weight, preferably at least 10% by weight. The quantity of oligomer does usually not exceed 50% by weight, preferably it does not exceed 40% by weight.

The radiation curable composition can also contain lower molecular weight monomers such as (meth)acrylic acid, beta-carboxyethyl acrylate, butyl(meth)acrylate, methyl(meth) acrylate, isobutyl(meth)acrylate, 2-ethylhexyl(meth)acrylate, cyclohexyl(meth)acrylate, n-hexyl(meth)acrylate, isobornyl(meth)acrylate, isooctyl(meth)acrylate, n-lauryl (meth)acrylate, octyl/decyl(meth)acrylate, 2-hydroxyethyl (meth)acrylate, phenoxyethyl(meth)acrylate, nonylphenolethoxylate mono(meth)acrylate, 2-(-2-ethoxyethoxy)ethyl (meth)acrylate, 2-butoxyethyl(meth)acrylate, cardura(meth) acrylate, N-vinyl pyrrolidone, 1,6-hexanediol diacrylate (HDDA), pentaerythritoltriacrylate (PETIA), trimethylolpropanetriacrylate (TA), phenylglycidyletheracrylate, and the (meth)acrylated ethoxylated or/and propoxylated derivatives thereof (such as (meth)acrylated ethoxylated or/and propoxylated trimethylolpropane, glycerol and/or pentaerythritol having a degree of alkoxylation lower than 4.

However, the quantity of such low molecular weight monomers is preferably low, generally lower than 10% by weight, preferably lower than 5% by weight. Most preferably the radiation curable compositions contain less than 1% by weight of low molecular weight monomers. Compositions containing substantially no such monomers are particularly preferred.

According to a preferred embodiment, the radiation curable composition also contains a certain amount of (meth) acrylated ethoxylated and/or propoxylated polyol (B) having a degree of alkoxylation of at least 4, more particularly the (meth)acrylated polyol (B) used in the preparation of the amino(meth)acrylate. The amount of such (meth)acrylated polyol (B) is generally at least 1%, more preferably at least 5% by weight. The quantity of such (meth)acrylated polyol (B) usually does not exceed 95% by weight.

The radiation curable compositions used in the present invention generally comprise at least one photoinitiator, that is a compound that can generate radicals by absorption of light, typically UV light. Typical photoinitiators are described in "The Chemistry of Free Radical Polymerization", edited by Graeme Moad and David H. Solomon; Pergamon (1995), pages 84 to 89. The photoinitiators usable in the compositions used in the invention can be selected from hydroxyketones, aminoketones, benzildimethyl-ketals, acyl phoshines, benzophenone derivatives, thioxanthones and mixtures thereof. Polymeric or multifunctional photoinitiators known to be less easily extracted than monomeric products are preferred. Typically about 0.2% by weight of a photoinitiator is used, if the composition has to be polymerised by exposure to UV radiation. Generally, the amount of photoinitiator in the composition is comprised between 0 and 15% by weight, preferably between 0.01 to 5% by weight.

Alternatively, the radiation curable composition without photoinitiator can be cured, generally by electron beam.

The radiation curable composition can also contain additives commonly used in varnishes, coatings, adhesives and inks, such as substrate wetting agents, anti-foam agents, dispersing agents, flow modification agents, slip agents, plasticizing diluents, fire retardant agents, UV-protection agents, adhesion promoters, reinforcing agents and stabilizers. The total amount of commonly used additives usually does not exceed 10% by weight. Preferably, the composition comprises from 0.01 to 5% by weight of commonly used additives as described here above.

The radiation curable composition can also contain one or more pigment or colorant. The colorants and pigments usable in the compositions of the invention are every pigments known in the art. A list of such pigments can be found in the Color Index. More particularly, those pigments may be cited such as Process Yellow 13 (Diarylide Yellow—Irgalite BAW of Ciba, Permanent GR of Clariant), Process Magenta Pigment 57 (Bona Calcium—Ilobona 4BY of Sun, Irgalite SMA of Ciba), Process Blue 15.3 (Copper Phthalocyanine—Irgalite GLO of Ciba, Hostaperm Blue B2G of Clariant), Process Black 7 (Oxidised Carbon Black—Special Black 250; Special Black 350 of Degussa), etc. The colorants and/or pigments are preferably used at 0-50% by weight of the total weight of the radiation curable composition, more preferably at 0-40% by weight.

The radiation curable composition may also comprise from 0 to 20% by weight of fillers or non reactive diluents or solvents.

The radiation curable compositions can be produced by mixing the selected components thereof by conventional known methods. The blend can be heated, if desired, to facilitate mixing.

The radiation curable compositions used in the invention are readily cured by ultraviolet light radiation or electron beam radiation. Curing can be achieved without the need of a conventional co-activator (such as a tertiary amine), which are known to contribute much to the odour of the compositions and coatings obtained thereof and are generally easily extracted. The radiation curable compositions based on the amino(meth)acrylates as described here above show themselves very low levels of components able to be extracted (after curing). In particular, they contain very low levels (<1000 ppm) of low molecular weight (meth)acrylates such as glycol(meth)acrylates (e.g. hydroxyethyl(meth)acrylate, diethylene glycol di(meth)acrylates) or polyol(meth)acrylates (e.g. trimethylolpropane tri(meth)acrylate), well-known to be present in (meth)acrylates derived from alkoxylated polyols. Hence, these radiation curable compositions have a low odour after cure, which make them useable in applications such as food packaging where off-odours should be absolutely avoided. Furthermore, the use of the amino(meth) acrylates as described here above have typically a low enough viscosity (<500 mPas) to limit or even avoid the use of a thinner in the radiation curable composition, be it a low molecular weight monomers or a solvent. These thinners are well-known to be easily extracted and/or give rise to odorous compositions. Moreover, the radiation curable compositions show a pot-life long enough to make them useable in an industrial environment. Eventually, these compositions have typically a low colour (<1 Gardner), which make them useable in clear coatings, adhesives or varnishes.

The radiation curable compositions as described here above are used for making varnishes, coatings, adhesives and inks. By inks is meant to understand liquid inks as well as paste inks.

The method according to the invention generally comprises the steps of:
(a) providing a radiation curable composition as described here above,
(b) applying said composition onto a surface, and
(c) irradiating the surface with actinic radiation.

In the method according to the invention, the compositions can be applied to the surface by any coating technique, including the spray, curtain, dip, pad and roll-coating techniques, as well as any printing technique such as lithography, serigraphy, flexography, gravure and inkjet printing.

The substrate to be coated or inked can be any substrate, such as wood, metal, paper, plastic, fabric, fiber, ceramic, concrete, plaster, glass, etc. Good results have been obtained with flexible substrates, especially with plastic substrates.

The irradiation of the surface can be done by high energy electrons or UV radiation.

The coatings, varnishes, adhesives and inks obtained by the method according to the invention have a low odour and a low extractable content which makes them very suitable for packaging applications, especially for food packaging.

The present invention therefore also relates to the coatings, varnishes, adhesives and inks obtained with the method and/or the amino(meth)acrylates described here above.

The coatings, varnishes, adhesives and inks obtained by the method according to the invention have a low odour and low extractable content which makes them very suitable for packaging applications, especially for food packaging. The coatings, varnishes, adhesives and inks do generally not contain low molecular weight co-activators like free tertiary amine, known to be odorous and easily extracted. They also can contain very low levels (generally <1000 ppm) of low molecular weight (meth)acrylates such as glycol(meth)acrylates (e.g. hydroxyethyl(meth)acrylate, diethylene glycol diacrylates) or polyol(meth)acrylates (e.g. trimethylolpropane tri(meth)acrylate) also known to be easily extracted. The coatings, varnishes, adhesives and inks obtained by the method according to the invention can be made such as the most easily extracted (meth)acrylated components are the amino(meth)acrylates described above. These amino(meth) acrylates showing a much lower extractability and odour level than those known in the art, the coatings, varnishes, adhesives and inks can meet the most severe regulations on migration from food packaging, when cured under UV light or high energy electrons. These regulations define the maximum amount of migration allowed (e.g. 10 ppb in the EU for a migrant not evaluated for genotoxicity) as well as migration test conditions. Procedures employing food simulants are described, for the EU, in the "Practical Guide for users of European Directives on food contact materials" (SANCO D3/LR D), available from the Unit D3 "Chemical and Physical Risks; Surveillance", of the Health & Consumer Protection Directorate-General of the European Commission. For the US, the publication "Guidance for Industry Preparation of Premarket Notifications for Food Contact Substances Chemistry Recommendations" available from the Office of Premarket Approval, Center for Food Safety and Applied Nutrition, FDA, can be consulted.

The present invention is illustrated by the following, non-limiting examples.

EXAMPLE 1

1.A Preparation of Penta(OP)$_{1.8}$(OE)$_{7.2}$ acrylate

Acrylation through direct esterification of pentaerythritol (OP)$_{1.8}$(OE)$_{7.2}$ (IOH=440 mgKOH/g) was carried out adding to a double-wall glass reactor (1.5 l) fitted with an agitator, a thermometer, a gas inlet tube, a connection to vacuum and an azeotropic distillation column having a Dean-Stark separator at its overhead, 400 g (2.36 eq) Penta(OP)$_{1.8}$(OE)$_{7.2}$, 237.2 g (3.3 eq) acrylic acid, 230 g toluene (40% by weight of the reacting mixture), 500 ppm on end product methyl ether hydroquinone (MeHQ), and 0.1% on end product $H_3PO_2$. PTSA (p-toluenesulfonic acid, 8.87 g) was added to reach an end concentration of 1.3% wt by weight of the reacting mixture. An air sparge was injected to prevent gelation. The mixture was heated to reflux temperature (117° C.) and stirred until no more water was distilled over. After 8 hours, 53 g (94% of the theoretical value) of esterification water was collected in the Dean Stark. When no more water was distilled over, the mixture was cooled to 60° C. and neutralized by the addition of 140 g of a 50% solution of NaOH in water. This mixture was washed three times with 20% by weight of the reacting mixture with water containing 20% NaCl, dried via azeotropic distillation with air sparging to remove all the water and finally filtered. The toluene was distilled and stripped under vacuum (30 mmHg) to remove all traces of toluene (free solvent content <10 ppm). Air was sparged to prevent polymerization/gelation. A clear, low odour, low viscous (viscosity C/P (25° C.)=143 mPa·s) and low colored (0.6 Gardner) product was obtained.

1.B. Preparation of the Michaël Adduct Penta(OP)$_{1.8}$(OE)$_{7.2}$ Acrylate/Diethylamine (AA1)

To 200 g of the acrylate obtained in Example 1.A, 18.6 g of diethylamine was added in order to reach in the end product, a nitrogen content of 1.2%. After the slight exotherm observed during addition of the amine, the reaction mixture was maintain at 50° C. until the free diethylamine content reached 1000 ppm, as measured by titration. After being stripped to reach a free diethylamine content below 200 ppm, the end product was post-stabilized with 3000 ppm tris-nonylphenylphosphite. A clear, low odour, low viscous (viscosity C/P (25° C.)=172 mPa·s) and low colored (0.8 Gardner) product was obtained.

1.C. Preparation of the Michaël Adduct Penta(OP)$_{1.8}$(OE)$_{7.2}$ Acrylate/Dipropylamine (AA5)

To 200 g of the acrylate obtained in Example 1.A, 10.7 g of dipropylamine was added in order to reach in the end product, a nitrogen content of 0.75%. After the slight exotherm observed during addition of the amine, the reaction mixture was maintain at 50° C. until the free dipropylamine content reached 1000 ppm, as measured by titration. After being stripped to reach a free dipropylamine content below 200 ppm, the end product was post-stabilized with 5000 ppm trisnonylphenylphosphite. A clear, low odour, low viscous (viscosity C/P (25° C.)=185 mPa·s) and low colored (0.6 Gardner) product was obtained.

EXAMPLE 2

Preparation of the Michaël Adduct Penta(OP)$_{1.8}$(OE)$_{7.2}$ Acrylate/Butylamine (AA2)

To 200 g of the acrylate obtained in Example 1.A, 11 g of butylamine was added in order to reach in the end product, a nitrogen content of 1.0%. After the slight exotherm observed during addition of the amine, the reaction mixture was maintain at 50° C. until the free butylamine content reached 1000 ppm, as measured by titration. After being stripped to reach a free butylamine content below 200 ppm, the end product was post-stabilized with 3000 ppm trisnonylphenylphosphite. A clear, low odor, medium viscous (viscosity C/P (25° C.)=495 mPa·s) and low colored (0.8 Gardner) product was obtained.

EXAMPLE 3

3.A. Preparation of TMP(OE)$_4$ Acrylate

Acrylation through direct esterification of TMP(OE)$_4$ (IOH=555 mgKOH/g) was carried out according the same procedure described in Example 1.A. A clear, low odour, low viscous (viscosity C/P (25° C.)=80 mPa·s) and low colored (0.6 Gardner) product was obtained.

3.B Preparation of the Michaël Adduct TMP(OE)$_4$ Acrylate/Dipropylamine (AA3)

To 200 g of the acrylate obtained in Example 3.A, 11 g of dipropylamine was added in order to reach in the end product, a nitrogen content of 1.3%. After the slight exotherm observed during addition of the amine, the reaction mixture was maintained at 50° C. until the free dipropylamine content reached 1000 ppm, as measured by titration. After being stripped to reach a free dipropylamine content below 200 ppm, the end product was post-stabilized with 3000 ppm trisnonylphenylphosphite. A clear, low odor, medium viscous (viscosity C/P (25° C.)=90 mPa·s) and low colored (0.4 Gardner) product was obtained.

EXAMPLE 4

Preparation of the Michaël Adduct TMP(OE)$_4$ Acrylate/Ethanolamine (AA4)

To 200 g of the acrylate such as obtained in Example 3.A, 20.7 g of ethanolamine was added in order to reach in the end product, a nitrogen content of 0.9%. After the slight exotherm observed during addition of the amine, the reaction mixture was maintained at 80° C. until the free ethanolamine content reached 500 ppm, as measured by titration. The end product was post-stabilized with 3000 ppm trisnonylphenylphosphite. A clear, low odor, medium viscous (viscosity C/P (25° C.)=450 mPa·s) and low colored (0.5 Gardner) product was obtained.

COMPARATIVE EXAMPLE 5R

Preparation of the Michaël Adduct Glycerol(OP)$_{3.5}$ Acrylate/Dipropylamine (CAA3)

Dipropylamine was reacted to the commercially available Glycerol(OP)$_{3.5}$ acrylate (aka "GPTA", e.g. Actilane 432 from AKZO Nobel Resins) so as having same nitrogen content (1.3%) as AA3, using a same procedure as in Example 3. A clear, low odour, medium viscous (viscosity C/P (25° C.)=100 mPa·s) and low colored (0.6 Gardner) product was obtained.

COMPARATIVE EXAMPLE 6R

6R.A. Preparation of TMP(OE)$_3$ Acrylate

Acrylation through direct esterification of TMP(OE)$_3$ (IOH=640 mgKOH/g) was carried out according the same procedure described in Example 1.A. A clear, low odour, low viscous (viscosity C/P (25° C.)=75 mPa·s) and low colored (0.4 Gardner) product was obtained.

6R.B. Preparation of the Michaël Adduct TMP(OE)$_3$ Acrylate/Ethanolamine (CAA4)

Ethanolamine was reacted to the product obtained in 6R.A so as having same nitrogen content (0.9%) as AA4, using a same procedure as in Example 4. A clear, low odour, medium viscous (viscosity C/P (25° C.)=470 mPa·s) and low colored (0.6 Gardner) product was obtained.

Evaluation of the Products Obtained in Examples 3 to 6R:

Preparation of the radiation curable compositions: Compositions were prepared by adding to the aminoacrylates obtained in Examples 3, 4, 5R and 6R, 3.5% w/w p-phenyl benzophenone and 0.5% of a levelling agent (DC57, Dow Corning).

Application of the radiation curable compositions: These compositions were applied onto 23 μm PET (Mylar 813) films with a K303 Multicoater equipped with a flexo printing head and a 150 lines/inch@100% flexo plate (RK Print Coat Instruments Ltd., UK). This configuration allowed obtaining ca. 4 g/m$^2$ coatings with a reproducibility better than 5%. The coatings were UV-cured under air with a lab unit from Fusion (Hg medium pressure, 120 W/cm) at the maximum line speed allowing to obtain a talc-dry surface.

One-side extraction tests: One-side extraction tests have been carried out in commercial extraction cells (Callipac cells manufactured by TechPap, France) in which 2 dm$^2$ of the coated substrate was exposed to 200 ml of water (food simulant "A", EU Directive on Plastics 82/71/EEC). Test samples (12 cm-diameter discs) were placed in the extraction cell with the coated side facing the cavity where water was introduced afterwards. An internal standard (IS, 0.1 g dimethyl phthalate) and stabilizing solution (0.1 g methyl hydroquinone+80 ml methanol) was then added to the extracted solution.

All acrylated components of the aminoacrylates described in Examples 3 to 6R being volatile enough to be detected by gas chromatography, the latter was then studied by GC-MS. The solution had to be first preconcentrated for detection sensitivity reasons on C-18 SPE disposable cartridges (Supelclean ENVI-18, Supelco, UK) installed on a Visiprep SPE vacuum manifold (Supelco, UK). The SPE preconcentration yields for the acrylated components of the different compositions were evaluated in order to assess the overall efficiency of the preconcentration step and evidence any yield variation between the different aminoacrylates. A reference solution of the products obtained in Examples 3 to 6R (100 mg /1 in methanol) was diluted 100 times in water (by addition 2 ml of the reference solution to 198 ml of water). The diluted solution was then preconcentrated 100 times by SPE on a C-18 cartridge. The acrylated components in the reference and concentrated solutions were identified by GC-MS operated in the single ion mode, selecting fragment ions characteristic to acrylated products (mass/charge=55 and 99). The preconcentration yields were determined by comparing the total amounts of acrylated components (obtained by summing all GC-MS peak surface areas) in the concentrated solutions and in the reference solutions. Whatever the adduct, yields were always similar and lied between 85% and 90%. This indicated that the preconcentration step only leads to marginal losses of acrylated components and that the below extractability results are not biased by different preconcentration yields.

Extraction tests were performed at room temperature for three days. Blank cells with uncoated substrate were each time prepared in order to check for the absence of any contribution from the substrate. Extraction studies were always made in triplicate.

Extraction Test Results in Water: AA3 vs. CAA3

Extractabilities in water of the compositions obtained with Examples 3 (AA3) and Comparative Example 5R (CAA3) were measured on UV-cured coatings.

The acrylated extractables have been identified through GC-MS operated in the single ion mode, selecting fragment ions characteristic to the acrylated compounds of the formulation (mass/charge=55 and 99). Extractabilities were compared by summing all peak surface areas from acrylated components and normalizing with the IS surface area.

The below table shows results for AA3 and CAA3.

| Amino(meth)acrylate | Total Peak Area from acrylated components/Peak Area IS |
|---|---|
| Example 3 (AA3) | 0.28 ± 0.03 |
| Comparative Example 5R (CAA3) | 2.41 ± 0.15 |

While having similar average molecular weights (respectively, 470 and 480 Dalton) and molecular structures (triol alkoxylate acrylates), AA3 and CAA3 show quite surprisingly very different extractabilities. Using AA3 instead of CAA3 can reduce by almost a factor 10 the extraction of acrylates from radiation-cured coatings.

Extraction Test Results in Water: AA4 vs. CAA4:

Extractabilities in water of the compositions obtained with Examples 4 (AA4) and Comparative Example 6R (CAA4) were measured on UV-cured coatings by the same procedure as described for AA3 and CAA3. The below table shows results for AA4 and CAA4.

| Aminoacrylate | Total Peak Area from acrylated components/Peak Area IS |
|---|---|
| Example 4 (AA4) | 0.51 ± 0.06 |
| Comparative Example 6R (CAA4) | 0.92 ± 0.10 |

While being made from very similar molecular structures (trimethylolpropane alkoxylate acrylates), AA4 and CAA4 show significant different extractabilities. Using AA4 instead of CAA4 can reduce by almost a factor 2 the extraction of acrylates from radiation-cured coatings.

Evaluation of the Products Obtained in Examples 1 and 2:

Extraction tests performed by the same procedure as above using AA1, AA5 and AA2 instead of (C)AA3 or (C)AA4 has led to no detectable acrylated extracts. The limit of detection in those conditions was determined as 50 ppb.

The invention claimed is:

1. A method of making a low extractable coating, which comprises:
   (a) providing a radiation curable composition comprising: at least one amino(meth)acrylate,
      wherein the amino(meth)acrylate is produced by a method consisting essentially of
         reacting at least one primary or secondary amine (A) with at least one (meth)acrylated ethoxylated and propoxylated polyol (B) having a degree of alkoxylation of at least 4 and at least 3 (meth)acrylic groups,
            wherein the polyol (B) is a (meth)acrylated ethoxylated and propoxylated polyol having a molar ratio of propoxyl to ethoxyl units of 1:4,
   (b) applying said composition onto a surface,
   (c) irradiating the surface with actinic radiation or electron beam radiation, and
   (d) obtaining the low extractable coating.

2. The method according to claim 1, wherein the polyol (B) is selected from ethoxylated and propoxylated glycerol tri(meth)acrylates, ethoxylated and propoxylated trimethylolpropane tri(meth)acrylates or ethoxylated and propoxylated pentaerythritol tetra(meth)acrylates.

3. The method according to claim 1, wherein the polyol (B) is selected from the tetra(meth)acrylates of ethoxylated and propoxylated pentaerythritol having a degree of alkoxylation of 5 to 15.

4. The method according to claim 1, wherein the amine (A) corresponds to formula (I)

wherein $R^1$ is an alkyl, optionally substituted by hydroxy, alkoxy, tertiary amine and/or aryl, and, $R^2$ is hydrogen or an alkyl, optionally substituted by hydroxy, alkoxy, tertiary amine and/or aryl, with the proviso that $R^1$ and $R^2$ may be linked together in order to form a ring.

5. The method according to claim 1, wherein the amine (A) is selected from alkylamines and dialkylamines, wherein the alkyl groups, each independently, comprise from 1 to 12 carbon atoms, optionally substituted by a hydroxy.

6. The method according to claim 1, wherein the radiation curable composition comprises from 5 to 99% by weight of the amino(meth)acrylate.

7. The method according to claim 1, wherein the composition further comprises from 1 to 95% by weight of a (meth)acrylated ethoxylated and/or propoxylated polyol (B) having a degree of alkoxylation of at least 4.

8. The method according to claim 1, wherein the low extractable coating is a low extractable varnish, adhesive or ink.

9. The method according to claim 1, wherein the amount of the at least one primary or secondary amine (A) is less than 500 ppm after the reaction of the at least one primary or secondary amine (A) with at least one (meth)acrylated ethoxylated and propoxylated polyol (B) having a degree of alkoxylation of at least 4 and at least 3 (meth)acrylic groups is complete.

10. The method according to claim 1, wherein the amount of the at least one primary or secondary amine (A) is less than 200 ppm after the reaction of the at least one primary or secondary amine (A) with at least one (meth)acrylated ethoxylated and propoxylated polyol (B) having a degree of alkoxylation of at least 4 and at least 3 (meth)acrylic groups is complete.

11. The method according to claim 1, wherein the at least one primary or secondary amine (A) is stripped from the reaction product of the at least one primary or secondary amine (A) with at least one (meth)acrylated ethoxylated and propoxylated polyol (B) having a degree of alkoxylation of at least 4 and at least 3 (meth)acrylic groups.

12. The method according to claim 1, wherein the low extractable coating is suitable to be used for food packaging applications.

13. A method of making a low extractable coating, which comprises:
(a) providing a radiation curable composition comprising:
at least one amino(meth)acrylate and from 1 to 95% by weight of a (meth)acrylated ethoxylated and propoxylated polyol (B) having a degree of alkoxylation of at least 4,
wherein the amino(meth)acrylate is produced by a method consisting essentially of
reacting at least one primary or secondary amine (A) with at least one (meth)acrylated ethoxylated and propoxylated polyol (B),
wherein the amine (A) is selected from the group consisting of methylamine, ethylamine, propylamine, butylamine, hexylamine, 2-ethylhexylamine, cyclohexylamine, dimethylamine, diethylamine, dipropylamine, dibutylamine, ethanolamine and mixtures thereof,
wherein the polyols (B) are tetra(meth)acrylates of ethoxylated and propoxylated pentaerythritol having a degree of alkoxylation of 5 to 15, wherein a molar ratio of propoxyl toethoxyl units of 1:4, and wherein the molar ratio of amino groups of (A) to (meth)acrylic double bonds of (B) is 0.01:1 to 0.5:1
(b) applying said composition onto a surface,
(c) irradiating the surface with actinic radiation or electron beam radiation, and
(d) obtaining the low extractable coating.

14. The method according to claim 13, wherein the amine (A) is selected from the group consisting of diethylamine, dipropylamine, butylamine, and ethanolamine.

15. The method according to claim 1, wherein the amine (A) is selected from the group consisting of methylamine, ethylamine, propylamine, butylamine, hexylamine, 2-ethylhexylamine, cyclohexylamine, dimethylamine, diethylamine, dipropylamine, dibutylamine, ethanolamine and mixtures thereof.

16. The method according to claim 15, wherein the amine (A) is selected from the group consisting of diethylamine, dipropylamine, butylamine, and ethanolamine.

17. The method according to claim 1, wherein the molar ratio of amino groups of (A) to (meth)acrylic double bonds of (B) is 0.01:1 to 0.5:1.

18. The method according to claim 1, wherein the amount of the at least one primary or secondary amine (A) is less than 1000 ppm after the reaction of the at least one primary or secondary amine (A) with at least one (meth)acrylated ethoxylated and propoxylated polyol (B) having a degree of alkoxylation of at least 4 and at least 3 (meth)acrylic groups is complete.

* * * * *